(12) United States Patent
Beynet et al.

(10) Patent No.: US 12,179,262 B2
(45) Date of Patent: Dec. 31, 2024

(54) METHOD FOR MANUFACTURING A PART OF COMPLEX SHAPE BY PRESSURE SINTERING STARTING FROM A PREFORM

(71) Applicant: NORIMAT, Toulouse Occitaine (FR)

(72) Inventors: Yannick Beynet, Toulouse Occitaine (FR); Romain Epherre, Toulouse Occitaine (FR)

(73) Assignee: NORIMAT, Toulouse Occitaine (FR)

( * ) Notice: Subject to any disclaimer, the term of this patent is extended or adjusted under 35 U.S.C. 154(b) by 683 days.

(21) Appl. No.: 17/281,392

(22) PCT Filed: Oct. 1, 2019

(86) PCT No.: PCT/EP2019/076550
§ 371 (c)(1),
(2) Date: Mar. 30, 2021

(87) PCT Pub. No.: WO2020/070107
PCT Pub. Date: Apr. 9, 2020

(65) Prior Publication Data
US 2022/0032370 A1 Feb. 3, 2022

(30) Foreign Application Priority Data
Oct. 2, 2018 (FR) ...................... 1859100

(51) Int. Cl.
*B22F 3/12* (2006.01)
*B22F 3/10* (2006.01)
(Continued)

(52) U.S. Cl.
CPC ............ *B22F 10/14* (2021.01); *B22F 3/1021* (2013.01); *B22F 3/1275* (2013.01); *B22F 10/12* (2021.01);
(Continued)

(58) Field of Classification Search
CPC .......... B22F 10/12; B22F 10/14; B22F 10/18; B22F 10/28; B22F 2005/103;
(Continued)

(56) References Cited

FOREIGN PATENT DOCUMENTS

FR 3042992 5/2017
WO WO-2011030815 A1 * 3/2011 .............. B22F 3/105
(Continued)

OTHER PUBLICATIONS

Additive Manufacturing Processes: Selective Laser Melting, Electron Beam Melting and Binder Jetting—Selection Guidelines Gokuldoss (Year: 2017).*

(Continued)

*Primary Examiner* — Jenny R Wu
(74) *Attorney, Agent, or Firm* — Defillo & Associates, Inc; Evelyn A. Defillo

(57) ABSTRACT

This invention relates to a method for manufacturing a part of complex shape (3) by successive deposition of layers according to a technique of 3D additive printing and pressure sintering, comprising the following steps: an initial step of producing a model (1) from a material chosen from a porous or pulverulent material based on a metal alloy, a ceramic, a composite material and a lost material by formation of successive layers deposited according to the digitally controlled 3D additive printing technique, followed by a step of introducing a preform (1) made of porous or pulverulent material to be densified, derived from the model (1), into a mold (2) filled with a sacrificial porous or pulverulent material (13) in addition to the preform (1), the uniaxial densifying pressure sintering (10) then being applied to the mold (2) in order to form the part (3) which is finally extracted from the mold (2).

11 Claims, 2 Drawing Sheets

Figure 1:
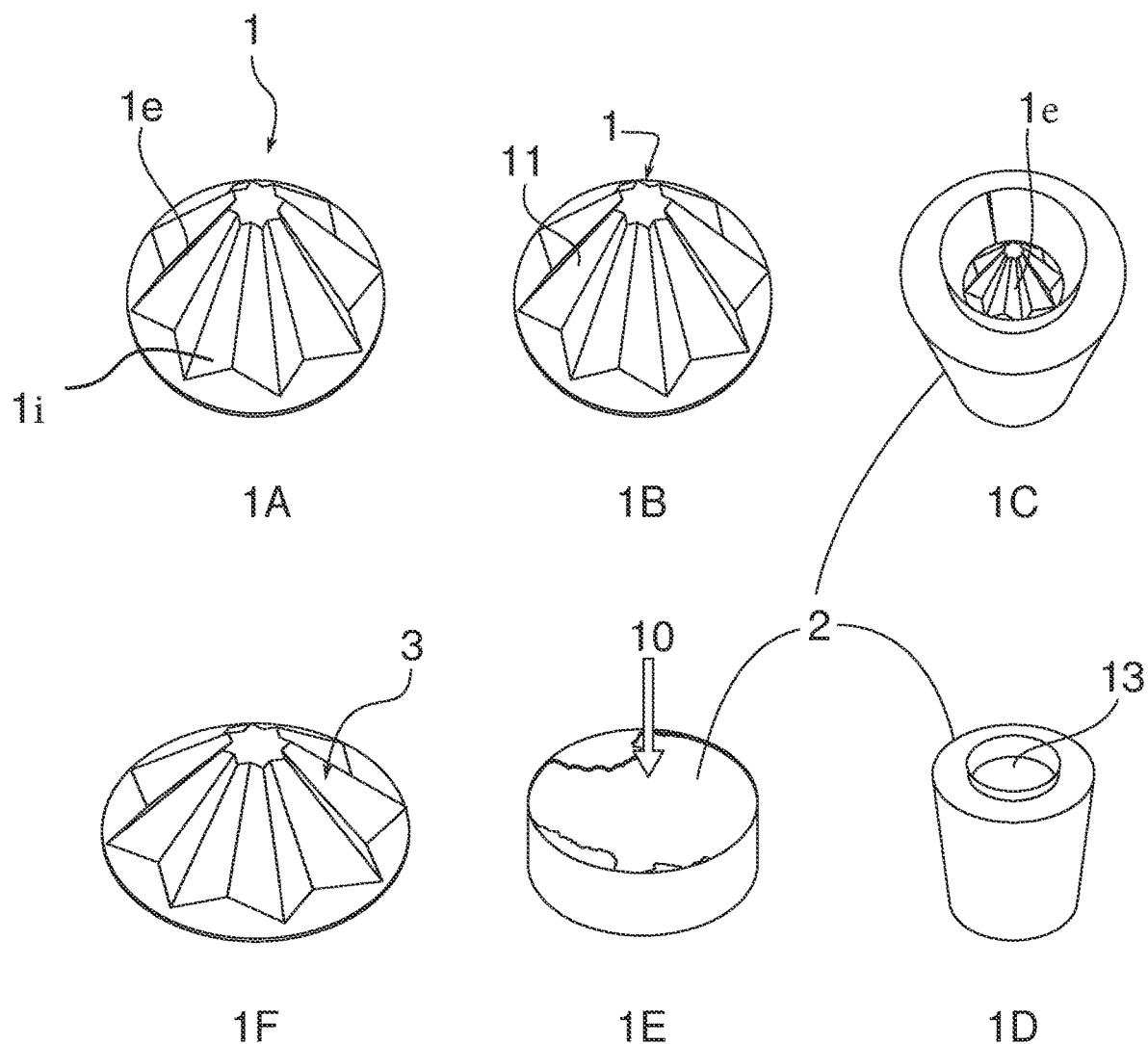

(51) Int. Cl.
| | |
|---|---|
| *B22F 10/12* | (2021.01) |
| *B22F 10/14* | (2021.01) |
| *B22F 10/18* | (2021.01) |
| *B28B 1/00* | (2006.01) |
| *B33Y 10/00* | (2015.01) |
| *B33Y 70/00* | (2020.01) |
| *C04B 35/622* | (2006.01) |
| *C04B 35/645* | (2006.01) |
| *B22F 5/10* | (2006.01) |
| *B22F 10/28* | (2021.01) |

(52) U.S. Cl.
CPC .............. *B22F 10/18* (2021.01); *B28B 1/001* (2013.01); *B33Y 10/00* (2014.12); *B33Y 70/00* (2014.12); *C04B 35/62222* (2013.01); *C04B 35/645* (2013.01); *B22F 2005/103* (2013.01); *B22F 10/28* (2021.01); *B22F 2301/15* (2013.01); *B22F 2301/35* (2013.01); *B22F 2998/10* (2013.01); *C04B 2235/3222* (2013.01); *C04B 2235/3225* (2013.01); *C04B 2235/3246* (2013.01); *C04B 2235/3248* (2013.01); *C04B 2235/3418* (2013.01); *C04B 2235/3427* (2013.01); *C04B 2235/386* (2013.01); *C04B 2235/425* (2013.01); *C04B 2235/6026* (2013.01)

(58) Field of Classification Search
CPC .............. B22F 2202/13; B22F 2301/15; B22F 2301/35; B22F 2998/10; B22F 2999/00; B22F 3/08; B22F 3/1021; B22F 3/105; B22F 3/1275; B22F 3/14; B22F 3/15; B22F 3/156; B22F 3/22; B22F 5/003; B28B 1/001; B28B 11/003; B28B 3/025; B29C 33/60; B33Y 10/00; B33Y 70/00; C04B 2235/3222; C04B 2235/3225; C04B 2235/3246; C04B 2235/3248; C04B 2235/3418; C04B 2235/3427; C04B 2235/386; C04B 2235/425; C04B 2235/6026; C04B 35/62222; C04B 35/645; Y02P 10/25

See application file for complete search history.

(56) References Cited

FOREIGN PATENT DOCUMENTS

| | | |
|---|---|---|
| WO | WO2016030654 | 3/2016 |
| WO | WO2016189312 | 12/2016 |

OTHER PUBLICATIONS

Fabrication of Al2O3-based composites by indict 3D printing Melcher (Year: 2006).*
Sintering and debinding of ceramic and metal parts (Year: 2017).*

* cited by examiner ent only of PCT/EP2019/076550 filed Oct. 1, 2019, under the International Convention and claiming priority over French Patent Application No. 1859100 filed Oct. 2, 2018.

METHOD FOR MANUFACTURING A PART OF COMPLEX SHAPE BY PRESSURE SINTERING STARTING FROM A PREFORM

CROSS REFERENCE TO RELATED APPLICATION

This application is a national stage entry of PCT/EP2019/076550 filed Oct. 1, 2019, under the International Convention and claiming priority over French Patent Application No. 1859100 filed Oct. 2, 2018.

TECHNICAL FIELD

The invention relates to a method for manufacturing a part of complex shape by pressure sintering starting from a preform produced by means of an additive technique.

The invention relates to the field of manufacturing parts, in particular industrial mechanical parts, by densifying porous or pulverulent materials. This field covers various techniques for densification by means of sintering under uni- or multiaxial, isostatic load, for example hot, in particular isostatic, pressing, high-pressure spark sintering known as SPS (spark plasma sintering), or selective laser sintering.

More particularly, the SPS sintering technique consists in consolidating a volume of ceramic, polymer or metal powders in a conductive mold in order to rapidly obtain finely microstructured dense materials. This consolidation is achieved by means of the simultaneous application of a load (under high uniaxial pressure exerted on the mold, for example of the order of 100 MPa and heating provided by a high-intensity pulsed direct current in the mold, of the order of 500 to 10000 A, the total sintering of the powders then being obtained in only a few minutes.

The main advantage of this SPS sintering technique is that, given the high rate of temperature rise and the relatively short residence times at high temperature, the densification of the material is accompanied with no, or very little, crystal growth.

PRIOR ART

The uniaxial pressure exerted by the SPS sintering technique has the drawback of causing heterogeneity of densification, in particular for parts of complex shape having substantial differences in thickness leading to a removal of material that is non-uniform, with respect to the limited space and time, between the regions of different thicknesses. In general, a complex shape refers to a shape of variable curvature with or without variation in thickness, or with a great variation in thickness with or without variation in curvature, and/or with geometric break.

In order to overcome this drawback of inhomogeneity of densification, patent document FR 3 042 992 provides for adding a deformable interface layer between the pulverulent (or porous) material and the counterform face of the mold tailored for producing the part.

However, sintering techniques also have a problem related to the use of molds or mold counterforms which do not allow easy removal from the mold when the part has a complex shape, in particular forming undercuts which are difficult to access and, therefore, tapers which are difficult to remove from the mold without partially destroying the part.

Counterforms may be prints obtained by pressing a bed of ceramic powder agglomerated by a binder or by binding ceramic powder on a polymer preform, the counterform being covered with an inert interface. These techniques have substantial limitations with regard to accessible geometries, due to the problems of undercuts of complex shapes, and of the surface state of these counterforms which requires covering by an interface.

In order to produce counterforms compatible with undercuts that can be removed from the mold, it is then necessary to multiply the number of counterforms in order to avoid problems of removal from the mold. The tools tailored for each counterform then need to be manufactured, resulting in additional design and machining steps. The assembly of these many counterforms is also a source of defects (mismatched geometry of the final part, incipient cracks, loss of material, etc.).

In order to produce parts of complex shape by densifying material, it is also known practice to use the multiaxial isostatic loading technology known as HIP (hot isostatic pressing). This technology is illustrated for example by document WO 2016/189312 which provides for the use of a densifying furnace filled with a pressure transfer material completely surrounding the outer skin of an object preformed by means of an additive printing technique so as to have a skin and an inner volume of different densities. Such an approach implements oversized, complex and time-consuming means, in particular in the context of HIP technology.

Alternatively, the mold of document WO 2016/030654, which relates to the production of components by means of HIP technology, is produced using a sacrificial model of the component surrounded with ceramic. The model is removed to form a cavity and a metal layer is applied to the ceramic to constitute the mold which, filled with metal powder, is then placed in a HIP technology container. This solution is still complex and implements HIP technology.

SUMMARY OF THE INVENTION

The invention aims to overcome this problem, and to that end the invention provides for the use of a preform of the part produced by means of a digitally controlled additive technique combined with uniaxial densification.

More specifically, the subject of the present invention is a method for manufacturing a part of complex shape by successive deposition of layers according to a technique of 3D additive printing and pressure sintering, this method comprising the following steps: an initial step of producing a model from a material chosen from porous or pulverulent materials based on a metal alloy, a ceramic, a composite material and a lost material by formation of successive layers deposited according to the from a material chosen from a porous or pulverulent material based on a metal alloy, a ceramic, a composite material and a lost material digitally controlled three-dimensional (3D) additive printing technique, followed by a step of introducing a preform made of porous or pulverulent material to be densified, derived from the model, into a mold filled with sacrificial porous or pulverulent material in addition to the preform. The uniaxial densifying pressure sintering is then applied to the mold in order to form the part which is finally extracted from the mold.

In particular, the 3D additive printing technique is chosen from stereolithography, binder jetting, controlled extrusion, fused filament fabrication, inkjet printing and aerosol jet printing.

In addition, the uniaxial densification allows simplified densification with respect to three-dimensional isostatic densification of HIP type, while making it possible to obtain features of physico-chemical homogeneity and precision of part dimensions.

According to some advantageous features:
- the sacrificial material is a material chosen from a ceramic, a silica, a metal silicate and a composite material;
- the ceramic may be chosen from powdered YSZ (yttria-stabilized zirconia), ATZ (alumina-toughened zirconia), ZTA (zirconia-toughened alumina), and alumina exhibiting degrees of densification that may range from 40 to 80%.
- an interface layer may be arranged on at least one face of the preform before inclusion thereof in the mold, in order to prevent any interaction between the preform and the sacrificial material;
- the materials of the preform, of the interface layer and of the sacrificial material exhibit the same densifying behavior at the sintering start and end temperatures.

A step of removing the binder from the preform may advantageously be performed at the output of the 3D additive printing by means of a heat treatment at temperatures of between 200 and 600° C. and rates of temperature rise of between 0.1 and 1° C./min, depending on the material of the counterform. This step makes it possible to remove organic compounds introduced into the material during the production of the counterform.

In addition, the step of binder removal may be followed by a step of pre-sintering which consists in heat-treating the counterform at higher temperatures, of between 600 and 1500° C. depending on the material of the counterform, this step making it possible to start the densification of the counterform, giving it mechanical strength and promoting the application of the interface.

According to a first implementation, the model directly provides the preform before densification and the mold is filled with pulverulent or porous sacrificial material before and after introduction of the preform.

According to another implementation, the method provides for the model being produced by means of additive printing from lost material—for example from wax or resin with a low melting point—and then a counterform made of porous or pulverulent material is formed around said model. The lost material being removed, the counterform is then filled with the material to be densified which constitutes preform corresponding to the model, before being introduced into the pressure sintering mold, the sacrificial material being added to the mold. After application of the pressure sintering, the part is extracted from the counterform.

In the figures, identical elements are identified by the same reference sign which refers to the one or more passages of the description in which it is mentioned.

PRESENTATION OF THE FIGURES

Figure 2:
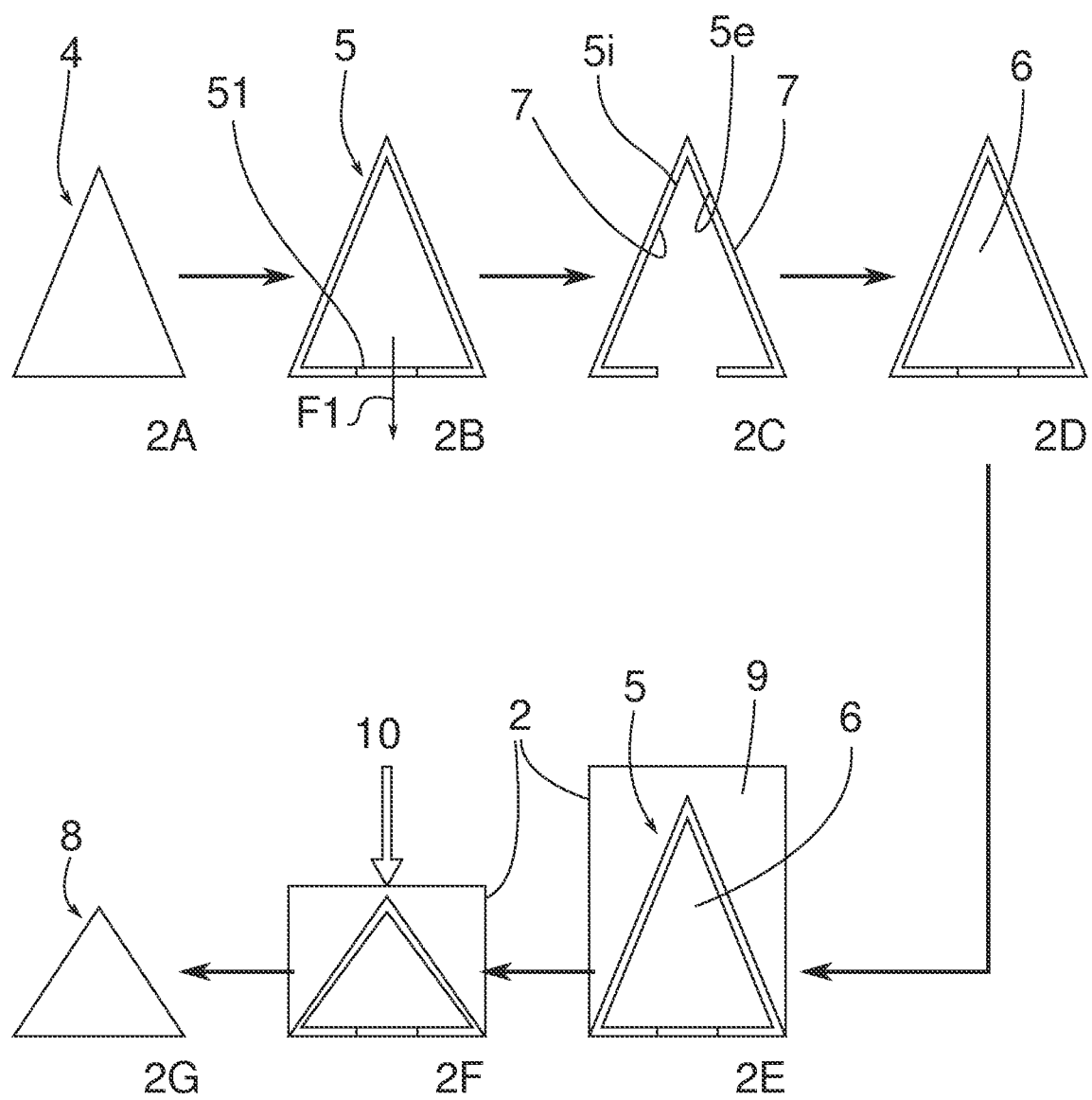

Further information, features and advantages of the present invention will become apparent from reading the following non-limiting description given with reference to the attached figures which show, respectively:

FIG. 1, perspective views of the main steps (1A to 1F) of one exemplary implementation of the method according to a first embodiment of the manufacture of a part of complex shape from a preform; and FIG. 2, schematic views in section of the main steps (2A to 2G) of one simplified exemplary implementation of the method according to a second embodiment of the manufacture of a part of complex shape from a preform.

DETAILED DESCRIPTION

The main steps 1A to 1F of one example of the method for manufacturing a part of complex shape according to the invention are illustrated in FIG. 1 by views in section. In step 1A, a porous metal model 1 of the part to be manufactured is formed by jetting in successive layers according to a 3D additive printing technique, binder jetting in this example. The model reproduces a configuration pre-saved in the control unit of the jetting system (not shown) and constitutes the preform of the part to be obtained after sintering. This preform defines the geometry of the shape of the part to be manufactured in the manufacturing method according to the invention.

The material of the part is initially in the form of a pulverulent or porous material, based on a metal alloy, in particular, in the examples illustrated, based on a titanium alloy, a titanium-aluminium alloy for example, a stainless steel or a nickel-based superalloy in the René family.

Advantageously, removal of the binder from the preform in the form of a model 1 is implemented by heat treatment at temperatures of between 200 and 600° C., 400° C. in the example, with a rate of temperature rise of between 0.1 and 1° C./min, 0.5° C./min in the example. This step makes it possible to remove organic compounds which may be introduced into the ceramic powder during the 3D printing for producing the counterform portions.

Preferably, pre-sintering is also performed after removal of the binder. This pre-sintering consists in treating the preform 1 at even higher temperatures, for example of between 600° C. and 1500° C. depending on the materials used, at 1200° C. in the example. This heat treatment makes it possible to start the densification of the counterform portions in order to give them mechanical strength and thus facilitate the application of the one or more interface layers, as described below.

In step 1B, a graphite interface layer 11 is advantageously deposited uniformly by spraying onto the outer face 1e (see step 10) or the inner face 1i (see step 1A) of the preform 1. Alternatively, a graphite layer is sprayed onto both faces 1i, 1e of the preform 1. This graphite layer 11 makes it possible to prevent any interaction between the model 1 and the sacrificial pulverulent material—ceramic in the example—which will be deposited later in order to facilitate final removal from the mold.

With reference to step 1C, the preform 1 covered with the graphite layer 11 is introduced into the SPS pressure sintering mold 2 on a bed of sacrificial material of ceramic powder introduced beforehand (not visible). Next, the sacrificial powder 13 is also introduced into the mold 2 so that this mold 2 is filled with an assembly of materials to be densified (step 10). The sacrificial powder makes it possible to compensate for differences in densification during the subsequent sintering.

SPS sintering is then applied to the mold 2 (load 10 of 50 MPa, direct current intensity of 3000 A, which results in the densification of the assembly of material contained in this mold 2 (step 1E). The densified part 3 is then removed from the mold 2 by unmolding and removing the portions of sacrificial material 13 which surround the part 3 (step 1F).

According to another embodiment, as illustrated by the schematic views of steps 2A to 2G of FIG. 2, a lost-wax model 4 is first printed by stereolithography (step 2A). The model is cone-shaped in the example.

A conical counterform 5 is then applied around the wax 4, in the form of a slip in the example illustrated (step 2B). Alternatively, the porous material forming the counterform may be a ceramic, a silica, a metal silicate, a composite material or the like.

The wax 4 is then removed from the counterform 5 by way of suitable heating allowing this wax to be liquefied. The liquid escapes (arrow F1) through an opening 51 formed at the base of the counterform cone 5 which is thus completely emptied (step 2C).

Advantageously, the counterform 5 is covered on its inner face 5i with a graphite interface layer 7 in order to facilitate removal from the mold and to prevent any interaction between the counterform and the material to be densified. Alternatively, a graphite layer is sprayed onto at least one of the faces 5i, 5e of the counterform 5.

With reference to step 2D, the counterform 5 is filled with pulverulent material to be densified constituting the preform 6 of the part to be manufactured and corresponding to the wax model. The graphite layer 7 of the inner face 5i of the counterform 5 then covers the preform 6.

Steps of binder removal and of pre-sintering are then advantageously implemented under the conditions of temperature and of rate of temperature rise described above.

The counterform 5 and the preform 6 are then introduced into the SPS sintering mold 2 (step 2E) and sacrificial material 9 is additionally introduced into the mold 2. The sacrificial material is, in the examples illustrated, a material chosen from a ceramic, a silica, a metal silicate, a composite material or the like.

The SPS densification is implemented by applying a load 10 and a direct current of 3000 A (step 2F). The sacrificial powder makes it possible to compensate for differences in densification during the sintering.

The part 8 is then extracted from the mold 2 by unmolding, by removing the sacrificial material 9 and the counterform 5 (step 2G).

The invention is not limited to the examples described and shown. Thus, the interface layers may be formed by a porous or pulverulent material other than graphite, in particular an yttrium oxide, boron nitride or the like.

The first implementation is particularly suited to hollow parts, having convex and concave opposite faces, and the second implementation to solid, biconvex parts.

Regardless of the implementation, the materials of the sacrificial material, of the counterform, of the preform and of the interface layers exhibit similar behavior with respect to the sintering start and end temperatures. The ceramic used is in the form of powder based on YSZ (yttria-stabilized zirconia), ATZ (alumina-toughened zirconia), ZTA (zirconia-toughened alumina), and alumina exhibiting degrees of densification that may range from 40 to 80%.

In addition, the interface layers may be applied in a form chosen from a spray, a deposit of powder bound by a binder corresponding to the powder (aqueous solution, Rhodovil® solution, etc.), a sheet of suitable shape or the like.

Furthermore, in the first embodiment, the preform is directly the model in the example described. In general, this preform may also be derived from a base model by means of another 3D additive printing technique and/or by using another material, which makes it possible to change printing technique and printing material depending on the choice of the material for the part to be manufactured.

The invention claimed is:

1. A method for manufacturing a part of complex shape by successive deposition of layers according to a technique of 3D additive printing and a pressure sintering, the method comprising the steps of:
   producing a model from a material chosen from porous or pulverulent materials based on a metal alloy, a ceramic, a composite material, or a lost material by formation of successive layers deposited according to a 3D additive printing technique which is digitally controlled;
   producing a preform from the model, the preform is made of porous or pulverulent material derived from the model,
   covering at least one face of the preform with a graphite layer to form an interface layer;
   introducing the preform covered with the graphite layer into a mold filled with sacrificial porous or pulverulent material;
   applying a pressure sintering under a uniaxial densifying pressure to the mold to form the part which is finally extracted from the mold;
   wherein pressure sintering is performed to a load between 50 MPa and 100 Pa and a direct current between 3000 A and 10000 A;
   wherein the 3D additive printing technique is chosen from stereolithography, binder jetting, controlled extrusion, fused filament fabrication, inkjet printing, or aerosol jet printing; and wherein the mold is filled with a pulverulent or porous sacrificial material before and after introduction of the preform, the sacrificial material being chosen from a ceramic, a silica, a metal silicate, or a composite material.

2. The method as claimed in claim 1, wherein the materials of the preform, of the interface layer, and of the sacrificial material have the same densifying behavior at a sintering start and end temperatures.

3. The method as claimed in claim 1, wherein the sacrificial material is a ceramic, the ceramic is chosen from YSZ, ATZ, ZTA and alumina powder exhibiting degrees of densification that range from 40 to 80%.

4. The method as claimed in claim 1, wherein the interface layer is applied in a form chosen from a spray, a powder deposit, and a sheet having a shape similar to a shape of the preform.

5. The method as claimed in claim 1, wherein the metal alloy of the part to be manufactured is chosen from a titanium alloy, a stainless steel, and a René nickel-based superalloy.

6. The method as claimed in claim 1, further including a step of removing a binder from the preform is performed at the output of the 3D additive printing by means of a heat treatment at temperatures of between 20° and 600° C. and rates of temperature rise of between 0.1 and 1° C./min.

7. The method as claimed in claim 6, wherein the step of binder removal is followed by a step of pre-sintering by heat-treating the preform at a temperature of between 60° and 1500° C.

8. The method as claimed in claim 1, wherein the model made of porous or pulverulent material constitutes the preform before the densification in the mold.

9. The method as claimed in claim 1, wherein the model is produced from lost material by additive printing, wherein a counterform made of porous or pulverulent material is formed around said model, wherein the lost material is removed, the counterform is then filled with the material to be densified which constitutes the preform corresponding to the model, before being introduced into the pressure sintering mold, and wherein the sacrificial material is added to the mold and in that, after application of the pressure sintering, the part is extracted from the counterform.

10. The method as claimed in claim 9, wherein the material of the counterform is chosen from a ceramic, a silica, a metal silicate, and a composite material, while exhibiting the same densifying behavior at the sintering start and end temperatures as that of the materials of the preform, of the sacrificial material and of the interface layer.

11. The method as claimed in claim 10, wherein the ceramic is chosen from powdered YSZ, ATZ, ZTA, or alumina having degrees of densification that range from 40 to 80%.

* * * * *